United States Patent [19]

Tonyali

[11] Patent Number: 5,401,787
[45] Date of Patent: Mar. 28, 1995

[54] FLAME RETARDANT INSULATION COMPOSITIONS

[75] Inventor: Koksal Tonyali, Cincinnati, Ohio

[73] Assignee: Quantum Chemical Corporation, Cincinnati, Ohio

[21] Appl. No.: 237,733

[22] Filed: May 4, 1994

[51] Int. Cl.⁶ .................... C08K 5/3492; C08K 5/09
[52] U.S. Cl. ................................. 524/101; 524/112; 524/412
[58] Field of Search ............... 524/112, 547, 101, 291, 524/351, 412; 117/110 R; 526/279

[56] References Cited

U.S. PATENT DOCUMENTS

| | | |
|---|---|---|
| 3,225,018 | 12/1965 | Zutty . |
| 3,392,156 | 7/1968 | Donaldson . |
| 3,624,024 | 11/1971 | Caldwell et al. ............... 524/112 |
| 3,646,155 | 2/1972 | Scott . |
| 3,832,326 | 8/1974 | North et al. . |
| 3,873,491 | 3/1975 | Gall ............................ 524/112 |
| 3,922,442 | 11/1975 | North et al. . |
| 4,318,845 | 3/1982 | Spivack et al. . |
| 4,349,605 | 9/1982 | Biggs et al. . |
| 4,374,219 | 2/1983 | Spivack et al. . |
| 4,381,362 | 4/1983 | Biggs et al. . |
| 4,397,981 | 8/1983 | Dol et al. . |
| 5,225,468 | 7/1993 | Biggs . |
| 5,312,861 | 5/1994 | Meverdon ..................... 524/547 |

FOREIGN PATENT DOCUMENTS

| | | |
|---|---|---|
| 89310667 | 4/1990 | European Pat. Off. . |
| 58-132013 | 8/1983 | Japan . |

*Primary Examiner*—Veronica P. Hoke
*Attorney, Agent, or Firm*—Gerald A. Baracka; William A. Heidrich

[57] ABSTRACT

Improved flame retardant moisture curable insulation compositions are comprised of an ethylene-alkoxysilane copolymer, a halogenated anhydride and antimony trioxide provided. The compositions have good processability and can be moisture cured to provide products which meet all of the requirements for SAE J-1128 low tension primary cable. The halogenated anhydride imparts flame retardancy to the compositions and also promotes cure by catalyzing the hydrolysis/condensation reaction of the silane copolymer. Optionally there may be included in the composition antioxidants, silanol condensation catalysts, organic halogen containing flame retardant compounds and other conventional compounding ingredients.

21 Claims, No Drawings

FLAME RETARDANT INSULATION COMPOSITIONS

BACKGROUND OF THE INVENTION

1. Field of the Invention

This invention relates to flame retardant insulation compositions which are moisture curable. The compositions, which have a superior balance of processability and physical properties, comprise an ethylene-alkoxy silane copolymer, a halogenated anhydride and antimony trioxide.

2. Description of the Prior Art

Crosslinked ethylene polymers are used extensively for wire and cable insulation. Crosslinking improves the mechanical strength, heat resistance and other essential properties of the polymers.

One type of flame retardant crosslinkable system utilizes ethylene-vinyl acetate (EVA) copolymers with a silane compound and a chemical crosslinking agent, most commonly an organic peroxide. Compositions of this type are disclosed in U.S. Pat. Nos. 3,832,326; 3,922,442; 4,349,605; and 4,381,362. Hydrated organic filler(s) are added to impart the desired degree of fire retardance. Whereas the crosslinkable EVA compositions are widely used by the wire and cable industry, they are not without problems. Due to the presence of the chemical crosslinking agent during processing and extrusion, operating conditions are limited and must be carefully controlled to avoid premature crosslinking, commonly referred to as "scorching." Premature crosslinking results in poor extrudate quality. To minimize scorching processors often must use conditions which require them to operate at line speeds much below the maximum capabilities of the equipment. Post crosslinking in an autoclave to obtain reasonable cure levels may also slow down the wire coating process.

To achieve the degree of crosslinking necessary to develop optimal physical properties with the EVA systems, fairly rigorous cure conditions must be used. Typically, the products are cured using a continuous vulcanization (CV) line where the extruded wire or cable product is contacted with 400° F., 200 psi steam in an autoclave. CV lines are expensive to maintain and operate.

Moisture curable compositions have been developed which eliminate the need for steam curing. These compositions utilize ethylene polymers which have alkoxy silane functionality incorporated into the polymer either by grafting an unsaturated alkoxy silane onto an ethylene polymer or by directly copolymerizing ethylene with an unsaturated alkoxy silane. Upon exposure to moisture, the alkoxy silane groups undergo hydrolysis/condensation reactions to form crosslinks. While compositions based on ethylene-alkoxy silane copolymers are essentially self-curing at room temperature, processors generally place the extruded wire or cable products in "cure rooms" maintained at high humidity and elevated temperatures, typically 100% humidity at 140° F., for 12 to 24 hours.

Crosslinkable ethylene polymers prepared by grafting unsaturated alkoxy silanes to ethylene polymers are disclosed in U.S. Pat. No. 3,646,155. Crosslinkable ethylene polymers prepared by copolymerizing ethylene with an unsaturated alkoxy silane are disclosed in U.S. Pat. Nos. 3,225,018 and 3,392,156.

Ethylene-alkoxy silane copolymers can also undergo premature crosslinking, especially in the presence of silanol condensation catalysts which are typically used to promote the hydrolysis/condensation reactions. Premature crosslinking adversely affects (lowers) the melt index of the ethylene copolymer and, if this occurs to a significant degree, will result in poor processability and unsatisfactory extrudate surface appearance. In extreme cases, extrusion of the ethylene copolymer compositions becomes essentially impossible. Significant premature crosslinking can occur even in the absence of silanol condensation catalysts. The problem is particularly troublesome with filled compositions since particulate fillers can contain substantial amounts of moisture. This moisture is released during the mixing and blending operations and hydrolyzes at least some of the alkoxy groups of the alkoxy silane. The problems associated with filled ethylene-vinylalkoxy silane copolymers are widely recognized throughout the industry and are described in European Patent Application 89310667.4 published Apr. 25, 1990.

In view of the aforementioned problems, it is not possible to use hydrated organic fillers, such as hydrated aluminum oxide, as flame retardants for the ethylene-alkoxy silane copolymers. Halogenated compounds are, therefore, utilized for this purpose.

U.S. Pat. No. 4,397,981 discloses the use of organic halogen compounds, such as chlorinated polyethylene, to impart flame retardance to moisture curable copolymers of olefins and olefinically unsaturated silane compounds. Use is, however, limited to random copolymers. Undesirable premature crosslinking is obtained when the halogenated organic compounds are employed with graft copolymers. Even with random copolymers, certain halogenated compounds adversely affect processability and can result in extrudates with undesirable surface blemishes.

It would be highly useful if improved olefin/alkoxysilane copolymer flame retardant compositions were available. It would be even more advantageous if these flame retardant compositions employed halogenated compounds which could be used with both random and graft ethylene/alkoxysilane copolymers. It would be still more desirable if the halogenated compounds also promoted crosslinking of the resulting formulation. These and other advantages are realized with the compositions of the present invention which will be defined in more detail to follow.

SUMMARY OF THE INVENTION

The improved flame retardant moisture curable insulation compositions of the invention comprise (a) 30 to 98 weight percent olefin-alkoxy silane copolymer derived from an α-olefin having from 2 to 8 carbon atoms and 0.25 to 20 percent by weight, based on the weight of the copolymer of an unsaturated alkoxysilane of the formula

$$R^*-Si(R^{**})_n(Y)_{3-n}$$

wherein R* is an ethylenically unsaturated hydrocarbon radical having from 2 to 6 carbon atoms, R** is a hydrocarbon radical having from 1 to 10 carbon atoms, Y is an alkoxy group having from 1 to 4 carbon atoms and n is an integer from 0 to 2; (b) 1 to 30 weight percent halogenated anhydride; and (c) 1 to 20 weight percent antimony trioxide. In an especially useful embodiment of the invention, (a) is an ethylene-vinyltrialkoxysilane copolymer and (b) is a brominated phthalic anhydride.

Preferred compositions contain 40 to 90 weight percent (a), 2 to 15 weight percent (b) and 1 to 15 weight percent (c). Optional ingredients such as hindered phenol antioxidants, organic halogen-containing flame retardant compounds and silanol condensation catalysts may also be included in the formulations. Electrical wires or cables consisting of a metal conductor coated with from 6 to 60 mils of the above-defined flame retardant moisture curable insulation compositions are also disclosed.

DETAILED DESCRIPTION OF THE INVENTION

The polymers used in the practice of this invention are olefin-alkoxy silane copolymers and include randomly copolymerized products and grafted products. More specifically, the olefin-alkoxy silane copolymers are comprised of α-olefins having from 2 to 8 carbon atoms and unsaturated alkoxy silanes of the formula

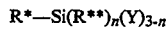

where R* is an ethylenically unsaturated hydrocarbon radical having from 2 to 6 carbon atoms, R** is a hydrocarbon radical having from 1 to 10 carbon atoms, Y is an alkoxy group having from 1 to 4 carbon atoms and n is an integer from 0 to 2. While the copolymers can have melt indexes from 0.1 up to about 400, melt indexes from 0.5 to 20 are more typical. Especially advantageous compositions highly useful for automotive wire and cable insulations are obtained using ethylene-alkoxy silane copolymers with melt indexes from 0.5 to 3.0.

Random copolymers of ethylene and unsaturated alkoxy silanes, such as vinyltrialkoxysilanes, are known. Such copolymers can be obtained in accordance with any of the recognized procedures such as those described in U.S. Pat. Nos. 3,225,018 and 3,392,156. Generally, these copolymerizations are carried out at high pressure and temperature in the presence of free radical initiators, most commonly organic peroxides. Copolymers wherein an unsaturated alkoxy silane is grafted onto an olefin polymer backbone are also known and can be prepared in accordance with conventional procedures. Free radical initiators are also generally used to facilitate grafting alkoxy silanes onto the polyolefins.

The unsaturated alkoxy silane will constitute from about 0.25 to 20 percent by weight and, more preferably, from about 0.5 to 10 percent by weight of the olefin copolymer. In a highly useful embodiment of this invention, the unsaturated alkoxy silane is a vinyltrialkoxysilane, i.e., where R* is a vinyl group and n is 0. It is especially advantageous to utilize vinyltrimethoxysilane or vinyltriethoxysilane, i.e., where R** is a vinyl group, n=0 and Y is methoxy or ethoxy, respectively.

α-Olefins containing 2 or 3 carbon atoms are most commonly copolymerized with the alkoxy silane to obtain the copolymers of the invention. Mixtures of two or more α-olefins can be used. Minor amounts of higher olefins may be present, particularly if the unsaturated alkoxy silane is grafted. While polyethylene is most commonly grafted, copolymers of ethylene with propylene, butene-1 and hexene-1 are also suitable. When the α-olefin and unsaturated alkoxy silane are copolymerized, ethylene is preferably employed particularly when the alkoxy silane is vinyltrimethoxysilane or vinyltriethoxysilane. If the olefin copolymer is comprised only of an α-olefin and unsaturated alkoxy silane, the α-olefin will constitute from 80 to 99.75 weight percent and, more preferably, 90 to 99.5 weight percent of the polymer.

One or more other monomers may be included with the α-olefin and unsaturated alkoxy silane. Such comonomers include vinyl esters of $C_{2-6}$ aliphatic carboxylic acids, $C_{1-6}$ alkyl acrylates, and $C_{1-6}$ alkyl methacrylates. The comonomers can be copolymerized with the unsaturated alkoxysilane and α-olefin or the unsaturated alkoxysilane can be grafted onto a copolymer formed by copolymerizing the α-olefin and comonomer. When comonomers are present, the copolymer will comprise 55 to 99.5 percent α-olefin, 0.25 to 20 percent unsaturated alkoxy silane and 0.25 to 45 percent comonomer(s). More commonly, the copolymers will contain 55 to 99 percent α-olefin, 0.5 to 40 percent unsaturated alkoxy silane and 0.5 to 40 percent comonomer. Preferred vinyl esters of $C_{2-6}$ aliphatic carboxylic acids include vinyl acetate and vinyl butyrate whereas ethyl acrylate and n-butyl acrylate are particularly useful $C_{1-6}$ alkyl acrylate comonomers. Ethyl methacrylate is a particularly useful $C_{1-6}$ alkyl methacrylate comonomer.

In a highly useful embodiment of the invention, the polymer is an ethylene-vinyltrimethoxysilane (EVTMOS) copolymer or ethylene-vinyltriethoxysilane (EVTEOS) copolymer. In an even more useful embodiment, the EVTMOS or EVTEOS copolymers are random copolymers.

A halogenated anhydride is employed with the ethylene-alkoxy silane copolymer to obtain the improved flame retardant insulation compositions of the invention. The halogenated anhydride imparts flame retardancy and also promotes crosslinking, i.e., catalyzes the hydrolysis/condensation reaction. Halogenated anhydrides useful for the invention correspond to the general formulas

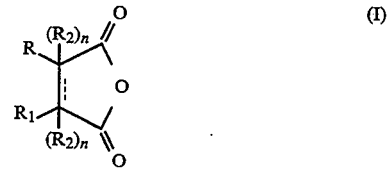

and

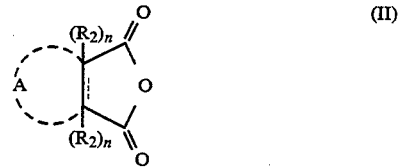

wherein R is halogen or a halogenated aliphatic group, $R_1$ is hydrogen, halogen, alkyl or halogenated alkyl, $R_2$ is hydrogen or halogen, n is 0 or 1 and A is a radical which completes a fused mono- or polynuclear ring such that A together with the group

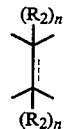

is a group represented by the formula

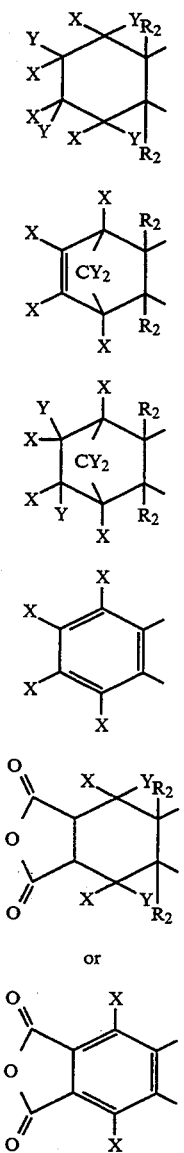

where $R_2$ is the same as previously defined, X is halogen and Y is halogen or hydrogen.

Halogen moieties in the above-identified formulas are chlorine or bromine; however, bromine is particularly advantageous. The halogenated aliphatic group R may be a conventional halogenated alkyl moiety or may be a halogenated polymeric moiety. In either case, the group may be saturated or may contain unsaturation and can be linear or branched. The number of carbon atoms in the aliphatic moiety R can range from 1 up to several thousand where it comprises a polymeric backbone, such as a halogenated polyethylene. Most commonly, the halogenated aliphatic group will contain from 1 up to about 200 carbon atoms. Compounds corresponding to Formula I where R is a halogenated polymeric moiety can be obtained by grafting maleic anhydride onto a chlorinated polymer, such as chlorinated polyethylene wax, using conventional grafting procedures known to the art including thermal and chemically initiated processes.

The alkyl or halogenated alkyl group $R_1$ can contain up to about 25 carbon atoms but, most commonly, will have from 1 up to about 18 carbon atoms. Where $R_1$ is an alkyl group it will preferably contain up to 8 carbon atoms and, most preferably, from 1 to 4 carbon atoms. Methyl and ethyl groups are particularly preferred alkyl groups. Halogenated alkyl groups, also referred to herein as haloalkyl groups, will preferably have from 1 to 4 carbon atoms and, more preferably, 1 or 2 carbon atoms. The number of halogen atoms in the halogenated alkyl group can range from 1 up to complete substitution, e.g., trichloromethyl and tribromomethyl.

The halogenated anhydrides are preferably brominated phthalic anhydrides and in a particularly useful embodiment of the invention the halogenated anhydride is a commercially available brominated anhydride, tetrabromophthalic anhydride, which is abbreviated herein as TBPA.

Antimony trioxide ($Sb_2O_3$) is employed with the halogenated anhydride and ethylene-alkoxy silane copolymer to obtain the present compositions. Antimony trioxide is a well known additive and is widely used when formulating flame retardant thermoplastic compositions containing halogenated compounds. While not a flame retardant per se, $Sb_2O_3$ has a synergistic effect on halogenated compounds.

Highly useful flame retardant compositions which exhibit a high degree of flame retardance and are capable of achieving acceptable levels of cure without the use of steam are produced using a halogenated anhydride and antimony trioxide with the ethylene-alkoxy silane copolymer. It will be understood, however, that further improvements in processability, physical properties, moisture curability and other properties may be achieved by incorporating one or more additional additives.

The improved flame retardant compositions of the invention will have 30 to 98 weight percent olefin-alkoxy silane copolymer is combined with 1 to 30 weight percent halogenated anhydride and 1 to 20 weight percent antimony trioxide. All weight percentages are based on the total weight of the composition. In an especially useful embodiment, the flame retarded compositions contain 40 to 90 weight percent ethylene-alkoxy silane copolymer, 2 to 15 weight percent halogenated anhydride and 1 to 15 weight percent antimony trioxide.

The halogenated anhydride, antimony trioxide and any additional additives are incorporated into the ethylene-alkoxy silane copolymer using conventional mixing procedures known to the art. Internal mixers such as Banbury mixers, Farrel continuous mixers, Bolling Mixtrumat mixers and Werner & Pfleiderer mixers are commonly used for this purpose. The ingredients may be added individually or combined for addition to the copolymer. It is also possible to prepare a masterbatch containing some or all of the additives and to add the masterbatch to the ethylene-alkoxy silane copolymer. The resin used for the masterbatch will typically be an olefin polymer or copolymer resin, such as low density polyethylene, which exhibits good compatibility with the ethylene-alkoxy silane copolymer. Using a masterbatch simplifies handling, especially when numerous additives are involved, and can facilitate incorporating difficultly dispersable additives which are difficult to incorporate.

While compositions of the copolymer containing only a brominated anhydride, such as TBPA, and antimony trioxide, have acceptable processability, physical properties, flame retardance and moisture curability, the formulations may also contain other compounds which function as flame retardants, synergists, condensation catalysts, antioxidants, UV absorbers, light stabilizing agents, optical brighteners, metal deactivators, lubricants, fillers, nucleating agents, pigments, antistatic agents and the like.

For example, it is often advantageous to include other organic halogen-containing compounds such as chlorinated paraffins, chlorinated polyethylenes, chlorinated naphthalene, brominated polystyrene, hexabromobenzene, tetrabromobisphenol A, tetrabromobisphenol A-bis(2-hydroxyethyl ether), tetrabromobisphenol A-bis(2,3-dibromopropyl ether), tetrabromobisphenol A-bis(allyl ether), hexabromocyclododecane, decabromodiphenyl oxide, octabromodiphenyl oxide, pentabromodiphenyl oxide, polydibromophenylene oxide, bis(tribromophenoxy)ethane, dibromoethyldibromocyclohexane, tetradecarbomophenoxy benzene, ethylene bispentabromobenzene, ethylene bis-tetrabromophthalimide and the like. By using one or more other halogenated compounds with the halogenated anhydride, it is possible to enhance certain properties of the composition. In one embodiment of the invention, ethylene bis-pentabromobenzene is included with TPPA and $Sb_2O_3$ to obtain compositions which exhibit a significantly reduced tendency to scorch during processing. Ethylene bis-pentabromobenzene, or decabromodiphenyl ethane as it is sometimes named, is a commercially available flame retardant compound.

Similarly, there may be included in the formulation other metallic compounds which amplify the effect of halogenated flame retardants such as tin oxide, zinc oxide, zinc borate, antimony silicates, aluminum trihydroxide and the like.

It may also be advantageous to complement the catalytic activity of the halogenated anhydride by including an effective amount of any of the commonly used silanol condensation catalysts. These catalysts generally include mineral and $C_{2-22}$ carboxylic acids, adducts of unsaturated carboxylic acids or anhydrides, organic titanates and complexes or carboxylates of lead, cobalt, iron, nickel, zinc and tin. Acetic acid, azelaic acid, lauric acid, palmitic acid, stearic acid, polyethylene grafted with maleic anhydride, acrylic acid or methacrylic acid, polypropylene grafted with maleic anhydride, acrylic acid or methacrylic acid, dibutyltin dilaurate, dibutyltin maleate, dibutyltin diacetate, dibutyltin dioctoate, stannous acetate, stannous octoate, lead naphthenate, zinc caprylate, and cobalt naphthenate are illustrative of silanol condensation catalysts which can be used.

For commercial applications, an antioxidant or antioxidant package is typically included in the formulation to stabilize the composition during processing and after moisture cure of the insulated wire or cable product or other article. Hindered phenol compounds are commonly employed for this purpose by themselves or in conjunction with hindered amines, thio compounds, phosphites or the like. Any of the well known antioxidants having one or more hindered phenolic substituents can be used to stabilize the products of the invention. For a comprehensive list of such compounds reference may be had to U.S. Pat. No. 4,318,845.

Hindered phenols which are especially useful for the compositions of the invention will contain one or more substituted phenyl groups of the formula

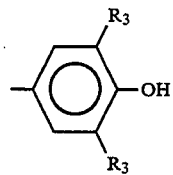

where $R_3$ is a $C_{1-4}$ alkyl group and, most preferably, a tertiary butyl group. The $R_3$ groups can be the same or different. Where more than one 3,5-dialkyl-4-hydroxyphenyl group is present, they will be joined through a linking group and the resulting compounds will correspond to the formula

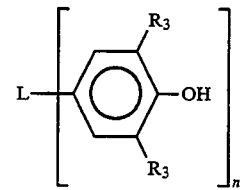

where n is an integer from 2 to 4 and L represents the linking group.

Representative linking groups include:

$$-CH_2- \quad (a)$$

$$C+CH_2O\overset{O}{\underset{\|}{C}}CH_2CH_2\mathcal{h}_{\overline{4}} \quad (b)$$

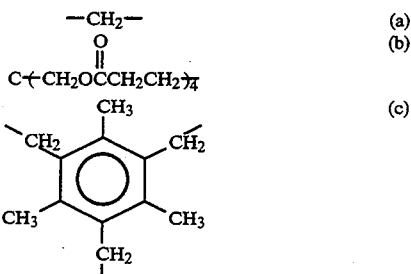

(c)

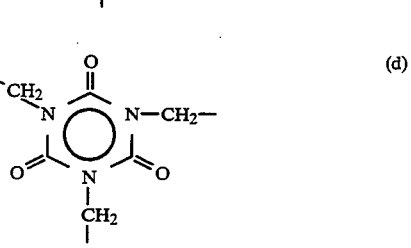

(d)

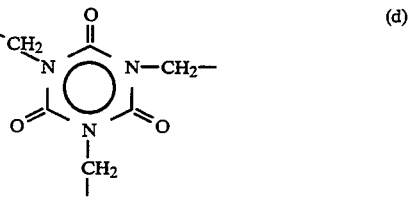

$$-CH_2CH_2-\overset{O}{\underset{\|}{C}}NHNH\overset{O}{\underset{\|}{C}}-CH_2CH_2- \quad (e)$$

and $$-CH_2CH_2COCH_2CH_2-S-CH_2CH_2OCCH_2CH_2- \quad (f)$$

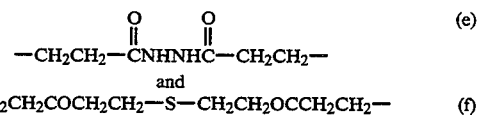

It is especially advantageous when the above-identified linking moieties are substituted with 3,5-di-t-butyl-4-hydroxyphenyl groups or 3-t-butyl-5-methyl-4-hydroxyphenyl groups.

Especially useful hindered phenol compounds of the above type which can be employed for the flame retardant products of the invention include:

4,4'-Methylenebis(2,6-di-t-butylphenol);

Tetrakis[methylene(3,5-di-t-butyl-4-hydroxyhydrocinnamate)]methane;

1,3,5-Trimethyl-2,4,6-tris(3,5-di-t-butyl-4-hydroxybenzyl)benzene;

1,3,5-Tris(3,5-di-t-butyl-4-hydroxybenzyl)-s-triazine 2,4,6 (1H,3H,5H)trione;

N,N'-Bis[3-(3,5-di-t-butyl-4-hydroxyphenyl)-propanyl]hydrazine;

Octadecyl 3,5-di-t-butyl-4-hydroxyhydrocinnamate; and

Thiodiethylenebis-(3,5-di-t-butyl-4-hydroxy)hydrocinnamate.

All of the foregoing materials are commercially available. For example, octadecyl 3,5-di-t-butyl-4-hydroxyhydrocinnamate and tetrakis[methylene (3,5-di-t-butyl-4-hydroxyhydrocinnamate)]methane are sold by Ciba-Geigy under the respective trademarks IRGANOX 1076 and IRGANOX 1010. Thiodiethylene bis-(3,5-di-t-butyl-4-hydroxy) hydrocinnamate is sold by Ciba-Geigy under the trademark IRGANOX ® 1035.

Illustrative hindered amines, thio compounds and phosphites which can be utilized in conjunction with the hindered phenol(s) include:

(1) Aminoaryl compounds such as phenyl-1-naphthylamine; phenyl-2-naphthylamine; N,N'-di-phenyl-p-phenylenediamine; octylated diphenylamine; nonylated diphenylamine; N-phenyl-N'-cyclohexyl-p-phenylenediamine; N,N'-di-sec.octyl-p-phenylenediamine and the like. Secondary aromatic amines are a particularly useful class of aminoaryl antioxidants.

(2) Thio compounds, such as the thioether synergists including dilauryl thiodipropionate and distearyl thiodipropionate, dioctadecyl sulfide, pentaerythritol betaalkylthiopropionates such as pentaerythritol tetrakis(betalaurylthiopropionate), and the like.

(3) Organic phosphites such as tetrakis-(2,4-di-t-butyl-phenyl)-4,4'-biphenylylenediphosphonite; tris-(2,4-di-t-butyl-phenyl)-phosphite; distearyl-pentaerythrityl-diphosphite; and alkanolamine esters of 1,1-biphenyl-2,2-diyl- and alkylidene-1,1-biphenyl-2,2-diyl-cyclic phosphites. These latter compounds are a particularly useful class of phosphites and are disclosed in U.S. Pat. Nos. 4,318,845 and 4,374,219.

In one highly useful embodiment of the invention, to provide flame retardant insulation compositions which exhibit good heat stability and which do not discolor or tarnish copper conductors to which they are applied, an antioxidant package comprised of specific hindered phenol(s) combined with a pentaerythritol betaalkylthiopropionate compound is employed. Such stabilizer combinations are disclosed in U.S. Pat. No. 5,225,468.

The pentaerythritol betaalkylthiopropionate will conform to the general formula

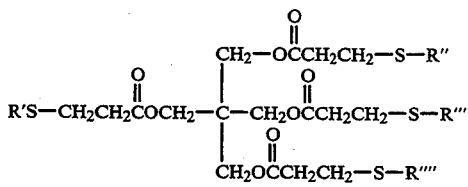

wherein R' R", R'" and R"" are alkyl groups having from 8 to 22 carbon atoms. Preferably, R' R", R'" and R"" will contain from 10 to 18 carbon atoms. The alkyl moieties may be the same or different and may be branched or linear. In an especially useful embodiment of the invention R' R", R'" and R"" are $C_{12}$ alkyl, i.e., lauryl, groups. Pentaerythritol tetrakis(betaalkylthiopropionates) corresponding to the above formula are commercially available from Argus Chemical Division, Witco Chemical Corporation, and pentaerythritol tetrakis(betalaurylthiopropionate) is sold under the trademark SEENOX 412 S.

In another highly useful embodiment of the invention wherein flame retardant insulation compounds having improved strip characteristics are produced, a stabilizer combination consisting of (i) tetrakis[methylene(3,5-di-tert-butyl-4-hydroxyhydrocinnamate)]methane, (ii) pentaerythritol tetrakis(betalaurylthiopropionate) and (iii) thiodiethylene bis(3,5-di-tert-butyl-4-hydroxyhydrocinnamate) is employed. In an even more preferred embodiment the weight ratio of components (ii) and (iii) is from 0.1:1 to 2:1.

The optional halogen-containing compounds can be present in amounts from 0 up to about 30 weight percent of the total composition. Any additional organic halogenated flame retardant(s) employed with the halogenated anhydride preferably constitute from about 5 up to about 20 weight percent of the composition.

If an optional silanol condensation catalyst is used, it can be present in an amount from 0 up to about 5 weight percent and, more preferably, will comprise from 0.05 up to about 1 weight percent of the composition.

Antioxidants are typically used for commercial insulation compositions to provide stabilization during processing and over the life of the wire/cable product. In general, from about 0.01 up to about 5 weight percent and, more preferably, from about 0.2 up to 2 weight percent antioxidant or antioxidant combination will be used for this purpose.

The incorporation of mineral fillers has also been found to impart advantageous properties to certain wire and cable formulations. For example, fillers such as magnesium hydroxide, aluminum hydroxide, talc, clays, mica and the like improve flame retardance, pinch strength and abrasion when incorporated at low levels, e.g., from 2 to 10 weight percent.

The flame retardant moisture curable compositions of the invention are particularly useful as insulating coatings for metal conductors—especially copper and aluminum single or multi-strand wire and cable. The compositions are typically applied by extrusion coating a substantially uniform 6 to 60 mils thick layer onto the metal conductor. The compositions are especially useful for service as single layer low tension primary cable insulation, such as used for automotive electrical applications. The compositions have a superior balance of processability and physical properties and, when properly formulated, do not discolor or tarnish the surface of the metal conductor. They are readily strippable from the conductor and leave a clean, shiny surface.

The polymer compositions of the invention may also be used for other applications. For example, they can be extruded onto pipes and conduits for electrical and other applications. They can be coextruded with one or more other thermoplastic materials to produce useful laminated constructions. Powders of these resins may be applied as coatings to either interior or exterior surfaces utilizing conventional powder coating procedures.

The following specific examples are provided to illustrate the flame retardant compositions of the invention and the manner in which the invention may be carried out. The examples are not intended to limit the invention and numerous variations within the scope of the invention will be apparent to those skilled in the art. In the examples, all parts and percentages are on a weight basis unless otherwise indicated.

EXAMPLE I

A flame retardant composition suitable for wire and cable insulation was prepared. The composition was comprised as follows:

|  | WEIGHT PERCENT |
|---|---|
| Ethylene-vinyltriethoxysilane (EVTEOS) copolymer; 2.3% vinyltriethoxysilane; melt index 1 | 58 |
| Low Density Polyethylene (LDPE); Density 0.923; melt index 2.2 | 14.6 |
| Tetrabromothalic anhydride (TBPA) | 5 |
| Antimony trioxide ($Sb_2O_3$) | 6.4 |
| Ethylene bis-pentabromobenzene | 14.4 |
| Dibutyltindilaurate (DBTDL) | 0.2 |
| Irganox ® 1010 | 0.6 |
| Irganox ® 1035 | 0.23 |
| SEENOX ® 412S | 0.16 |
| Polydimethyl Siloxane | 0.3 |

The formulation was prepared by dry blending the EVTEOS with a masterbatch containing all of the other ingredients. The dry blend was then extruded onto 20 AWG 7 strand copper wire. A continuous wire coating line (Davis standard 1½" screw, 20:1 (L/D) with a Maddock mixing head) operated at a speed of 1000 feet per minute was employed to coat the wire. The temperature profile of the extruder/mixer was 250° F./300° F./310° F./320° F. with the adapter and die head maintained at 325° F. and 350° F., respectively. No problems were encountered during processing and extrusion. A smooth extrudate of uniform thickness (16 mils) was applied to the wire. A portion of the coated wire was immersed in a 95° C. water bath for 24 hours to achieve a high degree of cure as evidenced by a gel content determined in accordance with ASTM D2765-84 greater than 50 percent. The cured coated wire met all of the requirements of SAE J-1128 low tension primary cable for TXL thin wall insulation. Results obtained for percent gel, flame retardance, strippability, oil absorption and physical properties (aged and unaged) were as follows:

| Percent Gel | 53.8 |
|---|---|
| Flame Retardance (UL44-HB) | PASS |
| burn time (seconds) | 13 |
| Strip force (lbs) | 7.3 |
| Percent oil Absorption | 0.4 |
| Break Strength (psi) | 2030 |
| Percent Elongation | 344 |
| Aged Break Strength (psi) | 2240 |
| Aged Percent Elongation | 276 |

To demonstrate the ability of the wire to cure under ambient conditions, another portion of the wire obtained from the continuous coating line was allowed to stand under ambient conditions. After 24 hours, the gel content measured in accordance with ASTM D2765-84 was 35 percent which indicates a high degree of cure. The cure progresses with additional storage under ambient conditions and ultimately gel contents exceeding 50% are achieved.

Compositions of the above type are particularly useful for service as single layer low tension primary cable insulation. The compositions which are typically applied at a thickness of from 10 to 50 mils and physically protect the metal conductor serve as an insulator. The compositions are particularly suited for automotive electrical applications and are especially useful for insulating of 20-24 AWG copper wire. They have a superior balance of processability and physical properties and, when properly stabilized, do not discolor or tarnish the surface of the copper conductor. Furthermore, by varying the formulation it is possible to vary shrinkback and adhesion of the compositions. This latter feature is particularly advantageous in automated operations where a critical balance of shrinkback and strippability must be maintained.

COMPARATIVE EXAMPLE A

To demonstrate the ability of the compositions of the invention to cure under ambient condition and the improvement obtained by the inclusion of the halogenated anhydride, the following comparative composition was prepared and extruded onto copper wire in accordance with the procedure of Example I. The composition was identical to that of Example I except that the tetrabromophthalic anhydride was omitted and the amount of LDPE was increased to compensate for the elimination of the TBPA. The comparative composition was comprised as follows:

|  | WEIGHT PERCENT |
|---|---|
| EVTEOS | 58 |
| LDPE | 19.6 |
| $Sb_2O_3$ | 6.4 |
| Ethylene bis-pentabromobenzene | 14.4 |
| DBTDL | 0.2 |
| Irganox ® 1010 | 0.6 |
| Irganox ® 1035 | 0.23 |
| SEENOX ® 412S | 0.16 |
| Polydimethyl Siloxane | 0.30 |

Wire coated with the comparative formulation which was allowed to stand for 24 hours under ambient conditions showed no evidence of cure. The insulation completely dissolved when evaluated in the gel test, i.e., had zero percent gel. These results compared with the effect obtained with the product of Example I clearly show the reduction in moisture curability when the halogenated anhydride is omitted.

It was, however, possible to acceptably cure the compositions using more stringent cure conditions. For example, when wire coated with the composition was immersed for 24 hours in a 95° C. water bath, the cure was comparable to that observed with the product of Example I under the same conditions. The composition meets the minimum requirements of SAE J-1128 for TXL thin wall insulation; however, physical properties are lower than achieved with the composition of Example I and the strip force is considered to be marginal. Percent gel, flame retardance, strippability, oil absorption and physical properties of the wire cured 24 hours in 95° C. water were as follows:

| Percent Gel | 53.3 |
|---|---|
| Flame Retardance (UL44-HB) | PASS |
| burn time (seconds) | 19 |
| Strip force (lbs) | 4.5 |
| Percent Oil Absorption | 0.9 |
| Break Strength (psi) | 2000 |
| Percent Elongation | 286 |
| Aged Break Strength (psi) | 1770 |
| Aged Percent Elongation | 277 |

EXAMPLE II

To demonstrate the versatility of the invention and the ability to vary the components, a product of the following composition was prepared:

|  | WEIGHT PERCENT |
|---|---|
| EVTEOS | 60 |
| LDPE | 19 |
| TBPA | 2.9 |
| $Sb_2O_3$ | 8.4 |
| Ethylene bis-pentabromobenzene | 8.4 |
| DBTDL | 0.12 |
| Irganox ® 1010 | 1.07 |
| Irganox ® 1035 | 0.21 |
| SEENOX ® 412S | 0.21 |

The composition was prepared and coated onto copper wire following the procedure of Example I. Samples of the coated wire cured for 24 hours under ambient conditions had a gel content of 20 percent. Other samples of the coated wire cured by immersing in a 95° C. water bath for 24 hours had gel contents of 54.6 percent. The latter products met all of the requirements of SAE J-1128. Flame retardance, oil absorption, strippability and physical properties were as follows:

| Flame Retardance (UL44-HB) | PASS |
|---|---|
| burn time (seconds) | 15 |
| Strip force (lbs) | 6.3 |
| Percent Oil Absorption | 0.14 |
| Break Strength (psi) | 2160 |
| Percent Elongation | 320 |
| Aged Break Strength (psi) | 2500 |
| Aged Percent Elongation | 272 |

EXAMPLE III

To demonstrate the ability to use other halogenated compounds with the TBPA, the following composition was prepared.

|  | WEIGHT PERCENT |
|---|---|
| EVTEOS | 60 |
| LDPE | 16.4 |
| TBPA | 5.2 |
| $Sb_2O_3$ | 6 |
| Decabromodiphenyl oxide (DBDPO) | 11.2 |
| DBTDL | 0.2 |
| Irganox ® 1010 | 0.6 |
| Irganox ® 1035 | 0.3 |
| SEENOX ® 412S | 0.3 |

The formulation was mixed and extruded onto 20 AWG 7-strand copper wire in accordance with the procedure of Example I. The coated wire cured under ambient conditions for 3 days had a gel content of 27 percent. When cured for 24 hours in a 95° C. water, the gel content was 58 percent. The cured (24 hr at 95° C.) wire samples met all of the requirements of SAE J-1128 and percent oil absorption, strippability and physical properties were as follows

| Strip force (lbs) | 7.95 |
|---|---|
| Percent Oil Absorption | 0.15 |
| Break Strength (psi) | 1990 |
| Percent Elongation | 250 |
| Aged Break Strength (psi) | 2050 |
| Aged Percent Elongation | 230 |

COMPARATIVE EXAMPLE B

The superior ambient moisture curability of the products of the invention which contain the halogenated anhydride is further demonstrated by the following example wherein a formulation comparable to that of Example III but without the TBPA was prepared. To compensate for the omission of the TBPA, the amounts of DBDPO and DBTDL were correspondingly increased. The composition was as follows:

|  | WEIGHT PERCENT |
|---|---|
| EVTEOS | 60 |
| LDPE | 16.6 |
| $Sb_2O_3$ | 6 |
| DBDPO | 16 |
| DBTDL | 0.25 |
| Irganox ® 1010 | 0.6 |
| Irganox ® 1035 | 0.3 |
| SEENOX ® 412S | 0.3 |

Wire coated with the above composition in accordance with the usual procedure, when allowed to stand under ambient conditions for 3 days, gave only 5 percent gel indicating a markedly lower cure than obtained for the product of Example III under identical conditions.

EXAMPLES IV–VI

Three moisture curable flame retardant compositions suitable as wire and cable insulation were prepared. The compositions were produced by mixing the ingredients in a Brabender blender for 5 minutes at 150° C. and 60 rpm. The ingredients were added individually, i.e., a masterbatch was not employed. The formulations were as follows:

| Product No. | IV | V | VI |
|---|---|---|---|
| EVTEOS | 73 | 70.6 | 70.4 |
| TBPA | 7.3 | 7.06 | 7.04 |
| $Sb_2O_3$ | 7.3 | 7.06 | 7.04 |
| Saytex ® BT-93[1] | 11.7 | 11.3 | 11.3 |
| Stearic Acid | 0.35 | — | 0.35 |
| Modified Polyethylene[2] | — | 3.5 | 3.5 |
| Irganox ® 1010 | 0.4 | 0.4 | 0.4 |

[1]Ethylene bis-tetrabromophthalimide
[2]High density polyethylene grafted with 2 percent maleic anhydride; melt index ~ 9

A 7 gram sample of each of the products was evaluated using an oscillating disk rheometer (5° arc, 1.5 inch diameter) at 360° F. The samples were run for 6 minutes and the torque (lb-in) measured. Samples were also cured in 95° C. water for 24 hours and the torque of the cured sample measured in the same manner. Torque values obtained for the uncured and cured samples were as follows:

| Product No. | IV | V | VI |
|---|---|---|---|
| Initial Torque (lb-in) | 11.0 | 5.4 | 10.8 |
| Torque after moisture cure (lb-in) | 50 | 20 | 48 |

I claim:

1. A flame retardant moisture curable composition comprising:

(a) 30 to 98 weight percent olefin-alkoxy silane copolymer derived from an α-olefin having from 2 to 8 carbon atoms and 0.25 to 20 percent by weight, based on the weight of the copolymer of an unsaturated alkoxysilane of the formula

wherein R* is an ethylenically unsaturated hydrocarbon radical having from 2 to 6 carbon atoms, R** is a hydrocarbon radical having from 1 to 10 carbon atoms, Y is an alkoxy group having from 1 to 4 carbon atoms and n is an integer from 0 to 2;

(b) 1 to 30 weight percent halogenated carboxylic acid anhydride; and (c) 1 to 20 weight percent antimony trioxide.

2. The composition of claim 1 where the halogenated anhydride corresponds to the formula

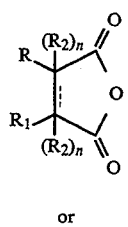

or

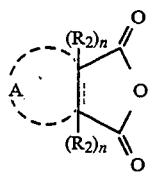

wherein R is halogen or a halogenated aliphatic group, $R_1$ is hydrogen, halogen, alkyl or halogenated alkyl, $R_2$ is hydrogen or halogen, n is 0 or 1 and A is a radical which completes a fused mono- or polynuclear ring such that A together with the group

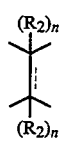

is a group represented by the formula

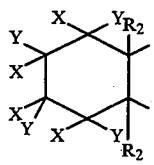

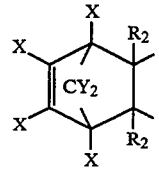

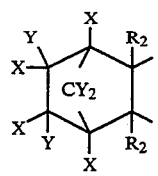

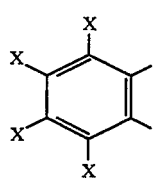

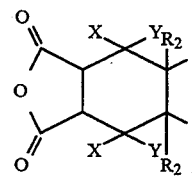

or

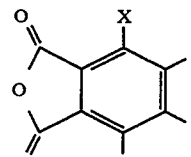

where $R_2$ is the same as previously defined, X is halogen and Y is halogen or hydrogen.

3. The composition of claim 2 wherein (a) contains 0.5 to 10 percent by weight unsaturated alkoxysilane and where R* is vinyl and n is 0.

4. The composition of claim 3 wherein (a) is a copolymer of ethylene with vinyltrimethoxysilane or vinyltriethoxysilane.

5. The composition of claim 4 wherein the halogenated anhydride (b) is a brominated anhydride.

6. The composition of claim 5 wherein (a) is present from 40 to 90 weight percent, (b) is present from 2 to 15 weight percent and (c) is present from 1 to 15 weight percent.

7. The composition of claim 6 wherein (a) is an ethylene-vinyltriethoxysilane copolymer having a melt index from 0.5 to 20 and (b) is a brominated phthalic anhydride.

8. The composition of claim 7 wherein the halogenated anhydride (b) is tetrabromophthalic anhydride.

9. The composition of claim 7 which additionally contains from 0 to 30 weight percent organic halogen-containing flame retardant compound, from 0 to 5 weight percent silanol condensation catalyst selected from the group consisting of mineral and $C_{2-22}$ carboxylic acids, adducts of unsaturated carboxylic acids or anhydrides, organic titanates and complexes or carboxylates of lead, cobalt, iron, nickel, zinc and tin and from 0.01 to 5 weight percent hindered phenol antioxidant.

10. The composition of claim 9 wherein the organic halogen-containing flame retardant is present from 5 to 20 weight percent.

11. The composition of claim 10 wherein the organic halogenated flame retardant is ethylene bis-pentabromobenzene.

12. The composition of claim 11 wherein the halogenated anhydride (b) is tetrabromphthalic anhydride.

13. The composition of claim 9 wherein the silanol condensation catalyst is present from 0.05 to 1 weight percent.

14. The composition of claim 13 wherein the silanol condensation catalyst is dibutyltin dilaurate.

15. The composition of claim 14 wherein the halogenated anhydride (b) is tetrabromphthalic anhydride.

16. The composition of claim 9 wherein the hindered phenol antioxidant is present from 0.2 up to 2 weight percent.

17. The composition of claim 16 wherein the hindered phenol antioxidant corresponds to the formula

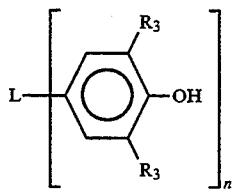

where R$_3$ is a C$_{1-4}$ alkyl group, n is an integer from 2 to 4 and L is a linking group selected from the group consisting of —CH$_2$— (a)

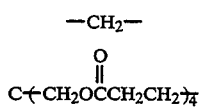 (b)

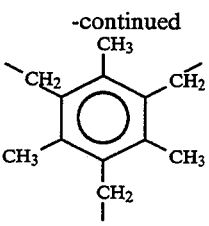 (c)

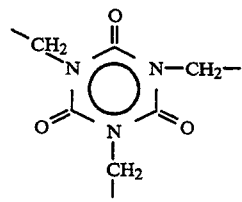 (d)

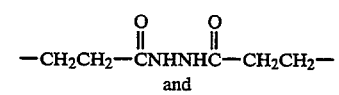 (e)

and

—CH$_2$CH$_2$COCH$_2$CH$_2$—S—CH$_2$CH$_2$OCCH$_2$CH$_2$—. (f)

18. The composition of claim 17 wherein the hindered phenol antioxidant is selected from the group consisting of
4,4'-methylenebis(2,6-di-t-butylphenol);
tetrakis[methylene (3,5-di-t-butyl-4-hydroxyhydrocinnamate)]methane;
1,3,5-trimethyl-2,4,6-tris(3,5-di-t-butyl-4-hydroxybenzyl)benzene;
1,3,5-tris(3,5-di-t-butyl-4-hydroxybenzyl)-s-triazine 2,4,6 (1H,3H,5H)trione;
N,N'-bis[3-(3,5-di-t-butyl-4-hydroxyphenyl)-propanyl]hydrazine;
octadecyl 3,5-di-t-butyl-4-hydroxyhydrocinnamate;
thiodiethylene bis-(3,5-di-t-butyl-4-hydroxy)hydrocinnamate;
and mixtures thereof.

19. The composition of claim 18 wherein the halogenated anhydride (b) is tetrabromophthalic anhydride.

20. The composition of claim 19 wherein the hindered phenol antioxidant is a mixture of tetrakis[methylene(3,5-di-tert-butyl-4-hydroxyhydro-cinnamate)]methane and thiodiethylene bis(3,5-di-tert-butyl-4-hydroxyhydrocinnamate) which is combined with pentaerythritol tetrakis(betalaurylthio-propionate).

21. An electrical wire or cable consisting essentially of a metal conductor coated with 6 to 60 mils of a flame retardant insulation composition as defined in any one of the preceding claims.

* * * * *